United States Patent Office 2,843,475
Patented July 15, 1958

2,843,475

METHOD OF PRODUCING ALUMINUM

Paul Weiss, Bonn, Germany, assignor to Vereinigte Aluminium-Werke Aktiengesellschaft, Bonn, Germany No Drawing. Application August 8, 1957
Serial No. 676,910

Claims priority, application Germany March 13, 1954

20 Claims. (Cl. 75—68)

The present invention relates to a method of producing aluminum from aluminum oxide, and more particularly to a method of simply and easily recovering aluminum from an aluminum oxide-containing material such as bauxite, clay, boiler ash or the like.

Aluminum is generally produced from aluminum oxide-containing materials by treatment thereof with a caustic soda solution and subsequent electrolytic recovery of the metal from the alumina obtained by such treatment.

Similar methods for the production of aluminum from aluminum oxide-containing materials have been sought, and particularly methods by which the aluminum oxide is converted to a gaseous aluminum compound which can in turn be converted to metallic aluminum. However, such methods have not had practical application because of extremely complicated apparatus requirements and also because the produced aluminum could only be obtained in dust-like form.

It is, therefore, a primary object of the present invention to provide a simple method of producing aluminum from aluminum oxide-containing materials.

It is another object of the present invention to provide a simple method of producing aluminum from aluminum oxide-containing materials by which the aluminum oxide is converted to a gaseous aluminum compound from which metallic aluminum can easily be recovered in compact state.

It is still another object of the present invention to provide a simple and economical method of producing aluminum from aluminum oxide-containing materials utilizing carbon and aluminum trisulfide according to which method practically all of the aluminum trisulfide utilized is recovered and can again be utilized for the production of additional aluminum from additional aluminum oxide-containing materials.

Other objects and advantages of the present invention will be apparent from a further reading of the specification and of the appended claims.

With the above objects in view, the present invention mainly consists in a method of producing aluminum from aluminum oxide, comprising the steps of heating a mixture including aluminum oxide, aluminum trisulfide and carbon to a temperature above 1000° C. so as to form a reaction gas including vapors of aluminum subsulfide, withdrawing the vapors of aluminum subsulfide, and cooling the thus withdrawn vapors of aluminum subsulfide so as to form metallic aluminum and aluminum trisulfide. The metallic aluminum can easily be separated from the aluminum trisulfide, and the aluminum trisulfide can, of course, be recycled for reaction with additional aluminum oxide and carbon to produce vapors of aluminum subsulfide which can in turn be converted to metallic aluminum and aluminum trisulfide.

The reaction of the present invention should preferably be carried out at low pressure. At a temperature of 1000–1200° C., a pressure of below 5 mm. Hg is preferably utilized. At the preferred temperature of 1400–1500° C. a pressure of 20 mm. Hg is suitable. The temperature may be raised above 1500° C., and at a temperature of 1500–2000° C. a correspondingly somewhat higher pressure may be utilized. Of course, at the higher temperatures the reaction proceeds more rapidly.

It is also possible to carry out the method of the present invention at a temperature above 2000° C., and in such case atmospheric pressure may be utilized with good results.

The reaction which occurs in the present invention is illustrated by the following equations:

(I)  $2Al_2O_3 + Al_2S_3 + 6C \rightarrow 3Al_2S + 6CO$ (II)  $3Al_2S \rightarrow Al_2S_3 + 4Al$ It may be seen from the above equations that although the aluminum trisulfide takes part in the reaction to form with the aluminum oxide aluminum subsulfide, the cooling of the aluminum subsulfide results in the formation of the same amount of aluminum trisulfide as originally utilized, except, of course, for small reaction losses which always occur. The reaction, in accordance with the method of the present invention, results in the production of relatively easily volatile aluminum subsulfide which upon cooling becomes converted to aluminum and aluminum trisulfide.

The reaction gases which will include carbon monoxide and vapors of aluminum subsulfide are withdrawn from the reaction chamber and cooled. It is possible to cool the vapors of aluminum subsulfide to a temperature which is above the vaporization temperature of aluminum trisulfide and below the vaporization temperature of aluminum. This will result in precipitation of aluminum from the vapors and the remaining vapors can then in a separate chamber be further cooled so as to precipitate the aluminum trisulfide which may be recycled.

It is preferred, in accordance with the method of invention, to cool the aluminum subsulfide vapors to a sufficiently low temperature to result in precipitation of both metallic aluminum and aluminum trisulfide. This mixture can easily be separated into aluminum and aluminum trisulfide, for example, by reheating the mixture to a temperature above the melting point of aluminum and below the melting point of aluminum trisulfide. This will result in the formation of molten aluminum and solid aluminum trisulfide, the molten aluminum easily being separated from the solid aluminum trisulfide.

The reaction between the aluminum oxide, aluminum trisulfide and carbon may be carried out in the reaction chamber and the reaction gases including the aluminum subsulfide withdrawn from the reaction chamber and into a condensation chamber wherein a lower temperature is maintained than in the reaction chamber. As indicated above, the aluminum may be deposited in metallic state in the condensation chamber by cooling to a temperature below the vaporization temperature of aluminum but above the vaporization temperature of aluminum trisulfide. Preferably both the aluminum and the aluminum trisulfide are precipitated in the condensation chamber and the aluminum then separated from the aluminum trisulfide by melting. In either case, the aluminum trisulfide may be mixed with fresh raw material and recycled.

The reactants may be reheated in the reaction chamber by any suitable means, for example, utilizing customary resistance devices or arc heating systems, an electric arc for instance being particularly suitable. It is only necessary that the apparatus utilized be one which permits reaching a temperature of at least 1000° C. in a gas tight chamber.

The reactants are, in accordance with the preferred embodiment of the present invention, in the form of a mixture of particles in finely divided state, preferably in the form of granules. According to a still further embodiment of the present invention, the reactants are briquetted and the briquettes heated in the reaction chamber, e. g. utilizing an arc furnace having a hollow electrode and introducing the briquettes into the arc flame through the electrode.

The reactants can be utilized in all proportions to give the reaction of the present invention. However, the best yield, that is conversion of all of the aluminum oxide to aluminum subsulfide from which the aluminum may be recovered, is best achieved by utilizing the aluminum trisulfide in a stoichiometric amount with respect to the amount of aluminum oxide. The carbon in such case should preferably be in amount which is at least stoichiometric, and preferably a slight excess of carbon is utilized. Generally, an excess of about 10% of carbon is preferred. Where the aluminum oxide is contained in a raw material which contains further metallic oxides such as $Fe_2O_3$, $SiO_2$ and $TiO_2$, the excess of carbon utilized should be at least sufficient to reduce these metallic oxides to the corresponding metals. The carbon utilized as a reactant may be in any suitable form for example in the form of coke or the like.

When utilizing a raw material such as bauxite which in addition to aluminum oxide contains small amounts of metallic oxides as purities such as $Fe_2O_3$, $SiO_2$ and $TiO_2$ the reaction of the present invention in the reaction chamber proceeds in accordance with the following equation:

(III)

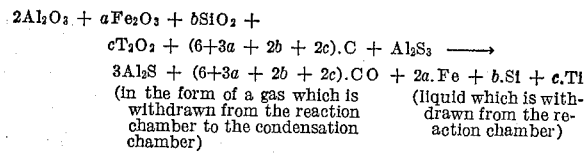

The reaction in the condensation chamber proceeds in accordance with the following equation:

(IV)

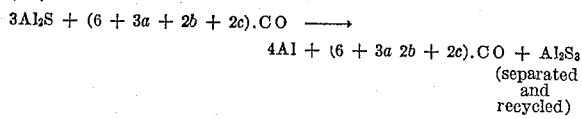

The overall reaction is as follows:

(V) $2Al_2O_3 + a.Fe_2O_3 + b.SiO_2 + c.TiO_2 + (6+3a+2b+2c).C + Al_2S_3 \rightarrow 4Al + 2a.Fe + b.Si + c.Ti + (6+3a+2b+2c).CO$ The present invention provides the great advantage over the known processes for the production of aluminum because it is not necessary to obtain aluminum by electrolysis when proceeding in accordance with the method of production in the present invention. The usual electrolysis processes require great amounts of electrical energy amounting generally to 16,000–17,000 kilowatt hours per ton of aluminum. Therefore, if no water power is available, the production of aluminum by such methods is not commercially practicable. The present invention on the other hand does not require large amounts of electrical energy for melting charge and permits the production of aluminum with a great saving in overall power requirements.

The following examples will more fully illustrate the process of the present invention, the scope of the invention not, however, being limited to the specific details of the examples.

*Example I*

A bauxite containing 57.4% of $Al_2O_3$
    3.95% of $SiO_2$
    22.9% of $Fe_2O_3$
    3.4% of $TiO_2$
    12.2% of loss on ignition is briquetted with aluminum trisulfide in stoichiometric amount and carbon in an amount exceeding by about 10% the required stoichiometrical amount. All components of the briquettes are used in a very finely divided state. The briquettes are heated in an electric arc furnace to about 1800° C.

The upper part of the arc furnace is connected with a customary condenser to which a vacuum pump is connected. A temperature of about 700° C. is maintained in the condenser and a pressure of about 10 mm. Hg.

The thus produced metallic aluminum having a great purity is precipitated in admixture with aluminum trisulfide in the condenser. The residue left in the arc furnace consists of metallic iron, silicon and titanium with only small amounts of aluminum.

*Example II*

A clay having the following composition 28.12% of $Al_2O_3$
    54.35% of $SiO_2$
    1.26% of $TiO_2$
    1.22% of $Fe_2O_3$, and a
    14.3% loss on ignition is dried, finely ground and mixed with aluminum trisulfide and carbon in approximately stoichiometric amounts. The mixture is granulated and heated to about 1500° C. in a resistance heated furnace wherein a pressure of about 5 mm. Hg is maintained.

The vapors of aluminum subsulfide along with carbon monoxide are passed into a condenser wherein the vapors are cooled to produce aluminum trisulfide and metallic aluminum. The mixture of metallic aluminum and the aluminum trisulfide is heated to above the melting temperature of the aluminum and the molten aluminum poured off and recovered. The obtained metallic aluminum has a purity of 99.6%.

A residue free of metallic aluminum and in conformity with the composition of the starting material remains in the furnace.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

This application is a continuation-in-part of application Serial No. 488,137, filed February 14, 1955, now abandoned.

What is claimed as new and desired to be secured by Letters Patent is:

1. A method of producing aluminum from aluminum oxide, comprising the steps of heating a mixture including aluminum oxide, aluminum trisulfide and carbon to a temperature above 1000° C. so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

2. A method of producing aluminum from aluminum oxide, comprising the steps of heating a mixture including aluminum oxide, aluminum trisulfide and carbon to a temperature of 1000–1200° C. and at a pressure below 5 mm. Hg so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

3. A method of producing aluminum from aluminum oxide, comprising the steps of heating a mixture including aluminum oxide, aluminum trisulfide and carbon to a temperature of 1400–1500° C. at a pressure of approximately 20 mm. Hg so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

4. A method of producing aluminum from aluminum oxide, comprising the steps of heating a mixture including aluminum oxide, aluminum trisulfide and carbon to a temperature of 1500–2000° C. and at a pressure below atmospheric pressure so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

5. A method of producing aluminum from aluminum oxide, comprising the steps of heating a mixture including aluminum oxide, aluminum trisulfide and carbon to a temperature above 2000° C. and at atmospheric pressure so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

6. A method of producing aluminum from aluminum oxide, comprising the steps of heating a mixture including an aluminum oxide-containing material selected from the group consisting of bauxite, clay and boiler ash and also including aluminum trisulfide and carbon to a temperature above 1000° C. so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

7. A method of producing aluminum from aluminum oxide, comprising the steps of forming briquettes including aluminum oxide, aluminum trisulfide and carbon; heating the thus formed briquettes to a temperature above 1000° C. so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

8. A method of producing aluminum from aluminum oxide, comprising the steps of heating a granular mixture including aluminum oxide, aluminum trisulfide and carbon to a temperature above 1000° C. so as to form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

9. A method of producing aluminum from aluminum oxide, comprising the steps of heating a mixture including aluminum oxide, aluminum trisulfide and carbon to a temperature above 1000° C. so as to form a reaction gas including vapors of aluminum subsulfide; withdrawing said vapors of aluminum subsulfide; cooling the thus withdrawn vapors of aluminum subsulfide so as to form metallic aluminum and aluminum trisulfide; and recycling the thus obtained aluminum trisulfide for formation of additional mixture including aluminum oxide, aluminum trisulfide and carbon, which mixture can be further processed to produce metallic aluminum and aluminum trisulfide.

10. A method of producing aluminum from aluminum oxide, comprising the steps of heating a mixture including aluminum oxide, aluminum trisulfide and carbon to a temperature above 1000° C. so as to form a reaction gas including vapors of aluminum subsulfide; withdrawing said vapors of aluminum subsulfide; cooling the thus withdrawn vapors of aluminum subsulfide so as to form metallic aluminum and aluminum trisulfide; and heating the thus obtained mixture of metallic aluminum and aluminum trisulfide at a temperature above the melting temperature of aluminum and below the melting temperature of aluminum trisulfide so as to form molten aluminum and thereby separate said aluminum from said aluminum trisulfide.

11. A method of producing aluminum from aluminum oxide, comprising the steps of heating a mixture including aluminum oxide, aluminum trisulfide and carbon to a temperature above 1000° C. so as to form a reaction gas including vapors of aluminum subsulfide; withdrawing said vapors of aluminum subsulfide; cooling the thus withdrawn vapors of aluminum subsulfide so as to form metallic aluminum and aluminum trisulfide; heating the thus obtained mixture of metallic aluminum and aluminum trisulfide at a temperature above the melting temperature of aluminum and below the melting temperature of aluminum trisulfide so as to form molten aluminum and thereby separate said aluminum from said aluminum trisulfide; and recycling the thus obtained aluminum trisulfide for formation of additional mixture including aluminum oxide, aluminum trisulfide and carbon, which mixture can be further processed to produce metallic aluminum and aluminum trisulfide.

12. A method of producing aluminum from aluminum oxide, comprising the steps of heating a mixture including aluminum oxide, an oxide of at least one other metal, aluminum trisulfide and carbon to a temperature above 1000° C. so as to form a non-gaseous reaction mixture including said other metal and to also form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

13. A method of producing aluminum from aluminum oxide, comprising the steps of heating a mixture including aluminum oxide, an oxide of at least one other metal selected from the group consisting of iron, silicon and titanium, aluminum trisulfide and carbon to a temperature above 1000° C. so as form a non-gaseous reaction mixture including said other metal and to also form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

14. A method of producing aluminum from aluminum oxide, comprising the steps of heating a mixture including aluminum oxide, iron oxide, silicon oxide, titanium oxide, aluminum trisulfide and carbon to a temperature above 1000° C. so as to form a non-gaseous reaction mixture including iron, silicon and titanium and to also form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

15. A method of producing aluminum from aluminum oxide, comprising the steps of heating a mixture including aluminum oxide, aluminum trisulfide and carbon to a temperature of 1400–1500° C. at a pressure of approximately 20 mm. Hg so as to form a reaction gas including vapors of aluminum subsulfide; withdrawing said vapors of aluminum subsulfide; cooling the thus withdrawn vapors of aluminum subsulfide so to as to form metallic aluminum and aluminum trisulfide; and heating the thus obtained mixture of metallic aluminum and aluminum trisulfide at a temperature above the melting temperature of aluminum and below the melting temperature of aluminum trisulfide so as to form molten aluminum and thereby separate said aluminum from said aluminum trisulfide.

16. A method of producing aluminum from aluminum oxide, comprising the steps of heating a mixture including aluminum oxide, aluminum trisulfide and carbon to a temperature of 1500–2000° C. and at a pressure below atmospheric pressure so as to form a reaction gas including vapors of aluminum subsulfide; withdrawing said vapors of aluminum subsulfide; cooling the thus withdrawn vapors of aluminum subsulfide so as to form metallic aluminum and aluminum trisulfide; and heating the thus obtained mixture of metallic aluminum and aluminum trisulfide at a temperature above the melting temperature of aluminum and below the melting temperature of aluminum trisulfide so as to form molten aluminum and thereby separate said aluminum from said aluminum trisulfide.

17. A method of producing aluminum from aluminum oxide, comprising the steps of heating a mixture including aluminum oxide, aluminum trisulfide and carbon to a temperature of 1400–1500° C. at a pressure of approximately 20 mm. Hg so as to form a reaction gas including vapors of aluminum subsulfide; withdrawing said vapors of aluminum subsulfide; cooling the thus withdrawn vapors of aluminum subsulfide so as to form metallic aluminum and aluminum trisulfide; heating the thus obtained mixture of metallic aluminum and aluminum trisulfide at a temperature above the melting temperature of aluminum and below the melting temperature of aluminum trisulfide so as to form molten aluminum and thereby separate said aluminum from said aluminum trisulfide; and recycling the thus obtained aluminum trisulfide for formation of additional mixture including aluminum oxide, aluminum trisulfide and carbon, which mixture can be further processed to produce metallic aluminum and aluminum trisulfide.

18. A method of producing aluminum from aluminum oxide, comprising the steps of heating a mixture including aluminum oxide, an oxide of at least one other metal, aluminum trisulfide and carbon to a temperature of 1400–1500° C. at a pressure of approximately 20 mm. Hg so as to form a non-gaseous reaction mixture including said other metal and to also form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

19. A method of producing aluminum from aluminum oxide, comprising the steps of heating a mixture including aluminum oxide, iron oxide, silicon oxide, titanium oxide, aluminum trisulfide and carbon to a temperature of 1400–1500° C. at a pressure of approximately 20 mm. Hg so as to form a non-gaseous reaction mixture including iron, silicon and titanium and to also form a reaction gas including vapors of aluminum subsulfide; withdrawing said vapors of aluminum subsulfide; and cooling the thus withdrawn vapors of aluminum subsulfide so as to form metallic aluminum and aluminum trisulfide.

20. A method of producing aluminum from aluminum oxide, comprising the steps of heating a mixture including aluminum oxide, aluminum trisulfide and carbon to a temperature above 1000° C. so as to form a reaction gas including vapors of aluminum subsulfide; withdrawing said vapors of aluminum subsulfide; and cooling the thus withdrawn vapors of aluminum subsulfide to a temperature above the vaporization temperature of aluminum trisulfide and below the vaporization temperature of aluminum so as to precipitate aluminum from said vapors and thereby separate said aluminum from said aluminum trisulfide.

References Cited in the file of this patent

UNITED STATES PATENTS

| | | |
|---|---|---|
| 2,206,562 | Gentil | July 2, 1940 |
| 2,470,305 | Gross | May 17, 1949 |

FOREIGN PATENTS

| | | |
|---|---|---|
| 501,233 | Great Britain | Feb. 23, 1939 |